(12) United States Patent
Schulein et al.

(10) Patent No.: US 8,036,343 B2
(45) Date of Patent: Oct. 11, 2011

(54) AUDIO AND DATA COMMUNICATIONS SYSTEM

(76) Inventors: Robert B. Schulein, Schaumburg, IL (US); Lon E. Bender, Pasadena, CA (US)

(*) Notice: Subject to any disclaimer, the term of this patent is extended or adjusted under 35 U.S.C. 154(b) by 1112 days.

(21) Appl. No.: 11/389,555

(22) Filed: Mar. 24, 2006

(65) Prior Publication Data

US 2007/0036281 A1 Feb. 15, 2007

Related U.S. Application Data

(60) Provisional application No. 60/665,591, filed on Mar. 25, 2005.

(51) Int. Cl.
*H04M 11/00* (2006.01)
*H04R 25/00* (2006.01)
(52) U.S. Cl. .......................... 379/52; 381/312
(58) Field of Classification Search .................. 455/463, 455/555, 557; 381/2, 16, 312; 379/52
See application file for complete search history.

(56) References Cited

U.S. PATENT DOCUMENTS

| | | | |
|---|---|---|---|
| 4,568,800 A | 2/1986 | Orikasa |
| 4,650,928 A | 3/1987 | Numata |
| 4,675,656 A | 6/1987 | Narcisse |
| 4,682,351 A | 7/1987 | Makino |
| 4,731,812 A | 3/1988 | Akerberg |
| 4,741,019 A | 4/1988 | Takahashi |
| 4,776,001 A | 10/1988 | Murata |
| 4,802,200 A | 1/1989 | Murata |
| 4,837,802 A | 6/1989 | Higashiyama |
| 4,860,337 A | 8/1989 | Shimura |
| 4,864,599 A | 9/1989 | Saegusa |
| 4,875,231 A | 10/1989 | Hara |
| 4,882,746 A | 11/1989 | Shimada |
| 4,897,864 A | 1/1990 | Murata |
| 4,962,524 A | 10/1990 | Murata |
| 5,014,295 A | 5/1991 | Kunihiro |
| 5,040,205 A | 8/1991 | Kunihiro |
| 5,123,043 A | 6/1992 | Higashiyama et al. |
| 5,136,629 A | 8/1992 | Toyama |
| 5,212,809 A | 5/1993 | Oka |
| 5,247,567 A | 9/1993 | Hirano |
| 5,259,020 A | 11/1993 | Hirano |
| 5,283,817 A | 2/1994 | Hara |
| 5,293,419 A | 3/1994 | Hirano |
| 5,305,373 A | 4/1994 | Mizumoto |
| 5,325,420 A | 6/1994 | Kikuchi |
| 5,329,575 A | 7/1994 | Matsuda |
| 5,349,631 A | 9/1994 | Lee |
| 5,357,558 A | 10/1994 | Yoshikawa |
| 5,363,402 A | 11/1994 | Harmon |
| 5,365,572 A | 11/1994 | Saegusa |
| 5,371,900 A | 12/1994 | Bar-On et al. |

(Continued)

OTHER PUBLICATIONS

PCT Notification of Transmittal of the International Search Report or the Declaration; International Search Report; and Written Opinion of the International Searching Authority; date is Mar. 24, 2006.

*Primary Examiner* — Davetta Goins
*Assistant Examiner* — Mohammad Islam
(74) *Attorney, Agent, or Firm* — Bishop & Diehl, Ltd.

(57) ABSTRACT

A communications system is disclosed that allows users to effectively communicate.

19 Claims, 10 Drawing Sheets

U.S. PATENT DOCUMENTS

| | | | |
|---|---|---|---|
| 5,371,901 | A | 12/1994 | Reed et al. |
| 5,392,330 | A | 2/1995 | Paniccia, Jr. |
| 5,428,669 | A | 6/1995 | McCarthy |
| 5,450,474 | A | 9/1995 | Hoflinger |
| 5,475,736 | A | 12/1995 | Ito |
| 5,483,676 | A | 1/1996 | Mahany et al. |
| 5,524,046 | A | 6/1996 | Paniccia, Jr. |
| 5,542,102 | A | 7/1996 | Smith |
| 5,644,621 | A | 7/1997 | Yamashita |
| 5,671,267 | A | 9/1997 | August et al. |
| 5,689,549 | A | 11/1997 | Bertocci |
| 5,802,467 | A | 9/1998 | Salazar |
| 5,963,624 | A | 10/1999 | Pope |
| 5,966,665 | A | 10/1999 | Taki |
| 6,006,086 | A | 12/1999 | Touzeau |
| 6,018,645 | A | 1/2000 | Spatz et al. |
| 6,029,071 | A | 2/2000 | Bertocci |
| 6,061,571 | A | 5/2000 | Tamura |
| 6,078,819 | A | 6/2000 | Ciccone |
| 6,088,595 | A | 7/2000 | Ciccone |
| 6,119,022 | A | 9/2000 | Osborn |
| 6,148,182 | A | 11/2000 | Thornton |
| 6,157,818 | A | 12/2000 | Rode |
| 6,175,589 | B1 | 1/2001 | Cummings |
| 6,181,916 | B1 | 1/2001 | Mou |
| 6,192,216 | B1 | 2/2001 | Sabat, Jr. et al. |
| 6,212,496 | B1 | 4/2001 | Campbell et al. |
| 6,216,017 | B1 | 4/2001 | Lee |
| 6,240,297 | B1 | 5/2001 | Jadoul |
| 6,308,083 | B2 | 10/2001 | King |
| 6,327,477 | B1 | 12/2001 | Hachimura et al. |
| 6,345,187 | B1 | 2/2002 | Berthoud et al. |
| 6,349,200 | B1 | 2/2002 | Sabat, Jr. |
| 6,374,079 | B1 | 4/2002 | Hsu |
| 6,434,388 | B1 | 8/2002 | Szalajski |
| 6,434,394 | B1 | 8/2002 | Grundvig |
| 6,456,840 | B1 | 9/2002 | Uda |
| 6,473,613 | B2 | 10/2002 | Beamish et al. |
| 6,532,361 | B1 | 3/2003 | Kamperschroer |
| 6,549,783 | B1 | 4/2003 | Touzeau |
| 6,549,790 | B1 * | 4/2003 | Rubbmark et al. ............ 455/557 |
| 6,640,108 | B2 | 10/2003 | Lu et al. |
| 6,668,178 | B1 | 12/2003 | Ramaswamy |
| 6,694,143 | B1 | 2/2004 | Beamish et al. |
| 6,721,573 | B2 | 4/2004 | Silvestri |
| 6,731,945 | B2 | 5/2004 | Do |
| 6,754,483 | B2 | 6/2004 | Beamish |
| 6,782,241 | B2 | 8/2004 | Kobayashi |
| 6,901,240 | B2 | 5/2005 | Tokoro |
| 6,907,226 | B2 | 6/2005 | Kang |
| 6,928,294 | B2 | 8/2005 | Maggenti |
| 6,952,588 | B1 | 10/2005 | Igarashi |
| 6,957,062 | B2 | 10/2005 | Castrogiovanni |
| 6,961,537 | B2 | 11/2005 | Rajaram |
| 6,961,561 | B2 | 11/2005 | Himmel |
| 6,963,740 | B1 | 11/2005 | Guthery |
| 6,968,208 | B2 | 11/2005 | Kacines |
| 6,980,830 | B2 | 12/2005 | Ahonen |
| 6,985,756 | B2 | 1/2006 | Castrogiovanni |
| 6,990,356 | B2 | 1/2006 | Charney |
| 7,551,942 | B2 * | 6/2009 | Hawker et al. ............. 455/556.1 |
| 2001/0003706 | A1 | 6/2001 | Warburton et al. |
| 2001/0029186 | A1 | 10/2001 | Canyon et al. |
| 2001/0044314 | A1 | 11/2001 | Vilhelm Martensson et al. |
| 2002/0082000 | A1 | 6/2002 | Sakai et al. |
| 2002/0086687 | A1 | 7/2002 | Kockmann et al. |
| 2002/0198028 | A1 | 12/2002 | Tsumura |
| 2003/0092453 | A1 | 5/2003 | Mills et al. |
| 2003/0224808 | A1 | 12/2003 | Bonta |
| 2004/0203936 | A1 | 10/2004 | Ogino |
| 2004/0209598 | A1 | 10/2004 | Beamish |
| 2004/0209654 | A1 | 10/2004 | Cheung et al. |
| 2005/0064860 | A1 | 3/2005 | DeLine |
| 2005/0090295 | A1 * | 4/2005 | Ali et al. .................... 455/575.2 |
| 2005/0136837 | A1 | 6/2005 | Nurminen et al. |
| 2005/0153716 | A1 * | 7/2005 | Bodley .......................... 455/463 |
| 2005/0159184 | A1 | 7/2005 | Kerner et al. |
| 2005/0197113 | A1 | 9/2005 | Lin et al. |
| 2006/0009214 | A1 | 1/2006 | Cardina et al. |

\* cited by examiner

AUDIO AND DATA COMMUNICATIONS SYSTEM

RELATED APPLICATIONS

This application claims the benefit of U.S. Provisional Patent Application Ser. No. 60/665,591, filed on Mar. 25, 2005, and incorporated herein by reference.

FIELD OF THE INVENTION

The present invention relates to communications systems, and in particular to systems that allows users to effectively communicate and access information in private and public venues.

FEDERALLY SPONSORED RESEARCH OR DEVELOPMENT

None

BACKGROUND OF THE INVENTION

In 1997, studies presented in MarkeTrak reports (MarkeTrack—The US Hearing Instrument Market, Sergei Kochkin, Ph.D., Published by Knowles Electronics, Itasca Ill.) estimated that of the 24 to 28 million Americans believed to experience significant hearing loss, approximately 21% of this population actually used hearing aids. It has also been projected in these and other studies that the impaired population is growing primarily as a result of the increase in the U.S. aging population, and due to an increase in exposure to high level sounds by the general population.

Individuals with hearing loss commonly have difficulty hearing low volume sounds as well as discriminating speech masked by speech like noise. In spite of the technical and marketing efforts of those producing hearing aids, market penetration of this population has not changed significantly. This is an unfortunate situation in that many individuals who suffer from hearing loss, and do not obtain help, tend to experience significant emotional stress by removing themselves from many desired social situations, due to an inability to effectively function.

A number of reasons have been documented, that contribute to the low penetration of hearing aid sales such as: 1) The fact that hearing loss typically comes on gradually and is not immediately obvious to an individual ("I am not convinced that 1 have a hearing problem"); 2) The negative stigma of being handicapped, associated with being a hearing aid user; 3) The belief that hearing aids do not create the same degree of improvement as say eyeglasses; and, 4) The fact that modern hearing aids are relatively expensive for their perceived value.

Hearing aid technology has however made steady improvements with respect to making sounds more audible and comfortable, as well as improving the perceived signal-to-noise ratio of amplified speech masked by noise.

In addition, products have also been developed that allow wireless connectivity between a microphone positioned near a desired but distant talker and a small radio receiver connected to a Behind-the-Ear (BTE) hearing aid. Wireless devices such as these are primarily used in teaching situations where one transmitter can serve a large number of students much like a radio station. Variations of such products have been developed as well for personal use, and in some cases allow remote communication from a cellular telephone or remote microphone by means such as a Bluetooth transmission link to a radio receiver connected to a user's hearing aid.

In general however these devices tend to be expensive, require a fair amount of user skill to operate, involve wireless transmission links that are often not secure to others monitoring the same radio channel, and do not allow two or more impaired individuals to communicate with each other in a wide variety of "real life" interactive situations.

These factors clearly indicate that products and technology that would enable the growing hearing impaired population to effectively communicate at home, in vehicles, and in a variety of private and public gatherings while at the same time removing barriers of cost, unimpressive performance, and the stigma of traditional hearing aids, is a highly desirable but unmet need.

In an embodiment, an objective of the current invention is to provide a means for individuals with varying degrees of hearing loss to effectively and easily communicate with family, friends, and the public in a variety of basic living, social and public settings.

In an embodiment, an objective of the current invention is to allow individuals with varying degrees of hearing loss to easily interact with modern communications technology such as cellular telephones, televisions, radios, computers, personal digital assistants, GPS systems, and information data bases.

In an embodiment, an objective of the current invention is to allow individuals with or without significant hearing loss to communicate more effectively in a variety of real world situations where achieving adequate speech intelligibility is difficult at best, such as in noisy restaurants, large social gatherings, and crowded public spaces.

In an embodiment, an objective of the current invention is to allow groups of individuals to communicate more effectively in business situations by eliminating the echo, interactive problems and difficulties for listeners at distant locations associated with hands free speaker telephones particularly in teleconference situations, while at the same time allowing a high degree of mobility throughout a business environment.

SUMMARY OF THE INVENTION

The present invention is directed to communications systems, and in particular to systems that allows users to effectively communicate and access information in private and public venues. According to one aspect of the invention, the system includes multiple communicators coupled to each other with, in addition thereto, a controller operatively coupled to each of the communicators.

According to another aspect of the invention, a system includes a first remote unit comprising a receiver and a hearing aid circuit operatively coupled to a speaker. The system also includes a second remote unit comprising a transmitter operatively coupled to a microphone. Further, the system includes a base unit comprising a transceiver unit and relaying wireless transmissions from the second remote unit to the first remote unit.

Other embodiments, systems, methods, features, and advantages of the present invention will be, or will become, apparent to one having ordinary skill in the art upon examination of the following drawings and detailed description. It is intended that all such additional systems, methods, features, and advantages included within this description be within the scope of the present invention, and be protected by the accompanying claims.

BRIEF DESCRIPTION OF THE DRAWINGS

The present invention may be better understood with reference to the following drawings. The components in the drawings are not necessarily to scale. Emphasis instead being placed on the principles of the invention. In the drawings like reference numerals designate corresponding parts throughout the several views.

DETAILED DESCRIPTION

The following descriptions of detailed embodiments are for exemplifying the principles and advantages of the inventions claimed herein. They are not to be taken in any way as limitations on the scope of the inventions.

In the FIGURES, the following reference numbers are used to depict corresponding elements wherein reference numbers having the same last two digits correspond to like elements:

| Reference Number | Element |
| --- | --- |
| 10 | System |
| 11 | Base Unit or Network Controller |
| 12 | Remote Unit or Communicator (#1) |
| 13 | Remote Unit or Communicator (#2) |
| 14 | Receiver and/or Transmitter (#1) |
| 15 | Receiver and/or Transmitter (#2) |
| 16 | Speaker - Remote Unit (#1) |
| 17 | Speaker - Remote Unit (#2) |
| 18 | Microphone - Remote Unit (#1) |
| 19 | Microphone - Remote Unit (#2) |
| 20 | Hearing Aid Signal Processing Block - (#1) |
| 21 | Hearing Aid Signal Processing Block - (#2) |
| 22 | Microphone Select and Control Block - (#1) |
| 23 | Microphone Select and Control Block - (#2) |
| 24 | Accessibility Control Block - (#1) |
| 25 | Accessibility Control Block - (#2) |
| 26 | Encryption and/or Decryption Block - (#1) |
| 27 | Encryption and/or Decryption Block - (#2) |
| 28 | Controller - (#1) |
| 29 | Controller - (#2) |
| 30 | Voice Recognition Module - (#1) |
| 31 | Voice Recognition Module - (#2) |
| 32 | Transceiver Unit - (#Base) |
| 34 | Encryption and/or Decryption Block - (#Base) |

-continued

| Reference Number | Element |
| --- | --- |
| 36 | Accessibility Control Block - (#Base) |
| 38 | Controller or Switch |
| 40 | Voice Recognition Module |
| 42 | External Source 1 |
| 44 | External Source 2 |
| 45 | External Source 3 |
| 46 | Wireless Data Transmission Signal |
| 48 | Wireless Data Transmission Signal |
| 50 | Remote Unit or Communicator (#3) |
| 51 | Remote Unit or Communicator (#4) |

Figure 1:
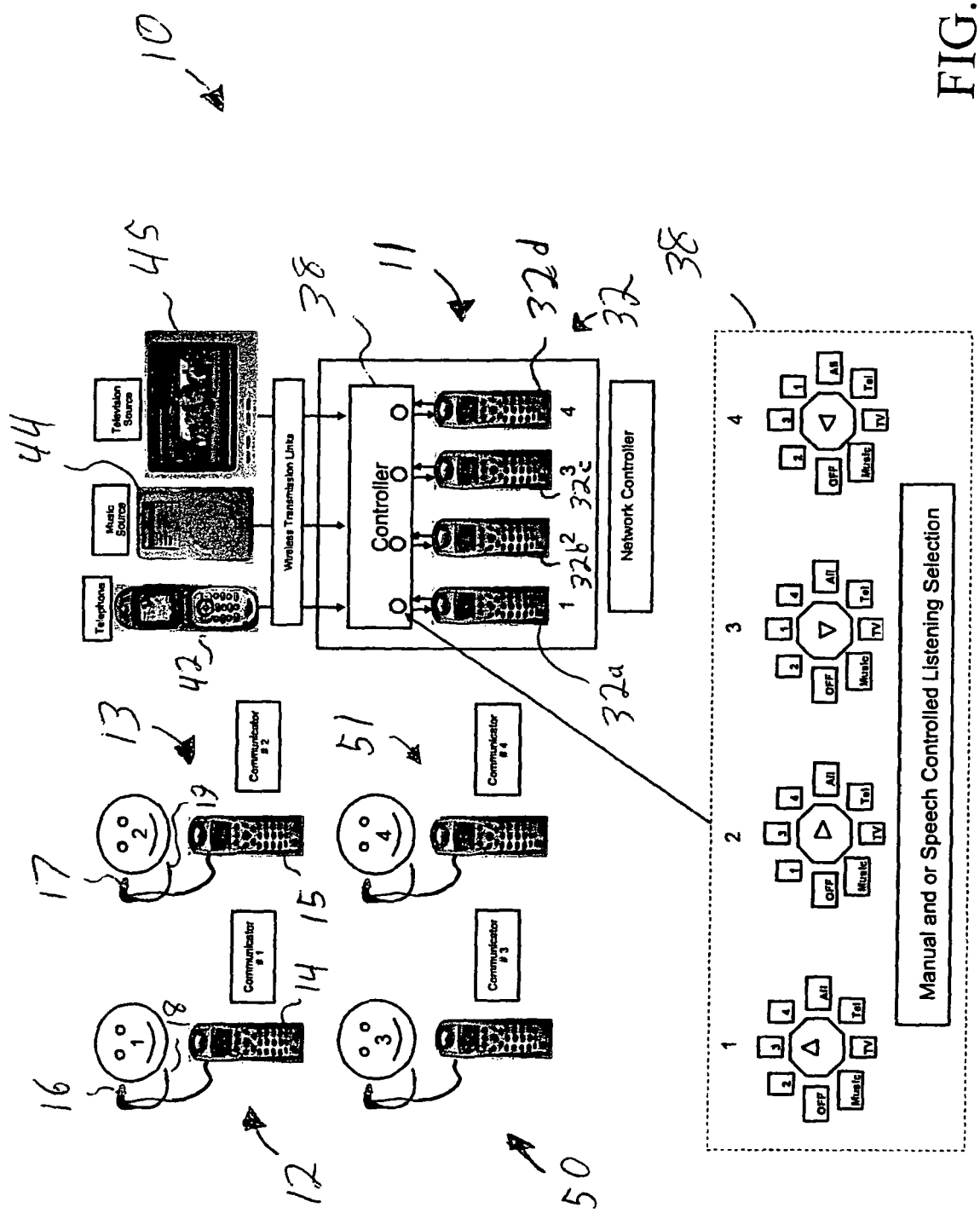
FIG. 1 is a simplified block diagram of a communications system in accordance with the present invention.

In one embodiment, a communications system 10 in accordance with the present invention is shown in FIG. 1, which involves up to four users. However, as will be appreciated by those having ordinary skill in the art, the present invention is not limited to four users and thus more or less users can be involved, if desired. Each user is equipped with an electronic/acoustical communicator 12, 13, 50 and 51 that enables both a wireless transmission and reception of audio signals with a system network controller or base unit 11. One possible method of transmission is that of a digitally processed, frequency hopping spread spectrum (DPFHSS) system operating at 5.8 GHz. This type of transmission is commonly used with consumer cordless telephone products, such as a Radio Shack Model 43-3703, for communications between a base telephone and an extension telephone. However, other wireless standards can be used such as, but not limited to, TD-SCDMA, WCDMA, CDMA2000.

The network controller or base unit 11 contains, in part, a transceiver unit 32 comprising, in an embodiment, four wireless transmission and receiving modules 32a-d that are uniquely paired with the four individual communicators 12, 13, 50 and 51, respectively. However, the transceiver unit 32 can comprise other suitable circuitry for conducting separate communication with each of the communicators 12, 13, 50 and 51. As shown in FIG. 1, these paired combinations allow for establishing four separate and secure transmission/reception links between the four users and the network controller 11. As will be appreciated by those having ordinary skill in the art, a relatively high level of security is achieved by virtue of the DPFHSS transmission technology, which is inherently a one-to-one paired communications technology. Additional components within the network controller 11, such as switch 38, which will be explained in detail in subsequent figures, allow the individual communications links to be tied together by manual, speech controlled and or automatic means, so as to connect to other wired and wireless devices such as telephones, audio news and entertainment sources, and other information sources that can communicate by audio means.

Figure 2:
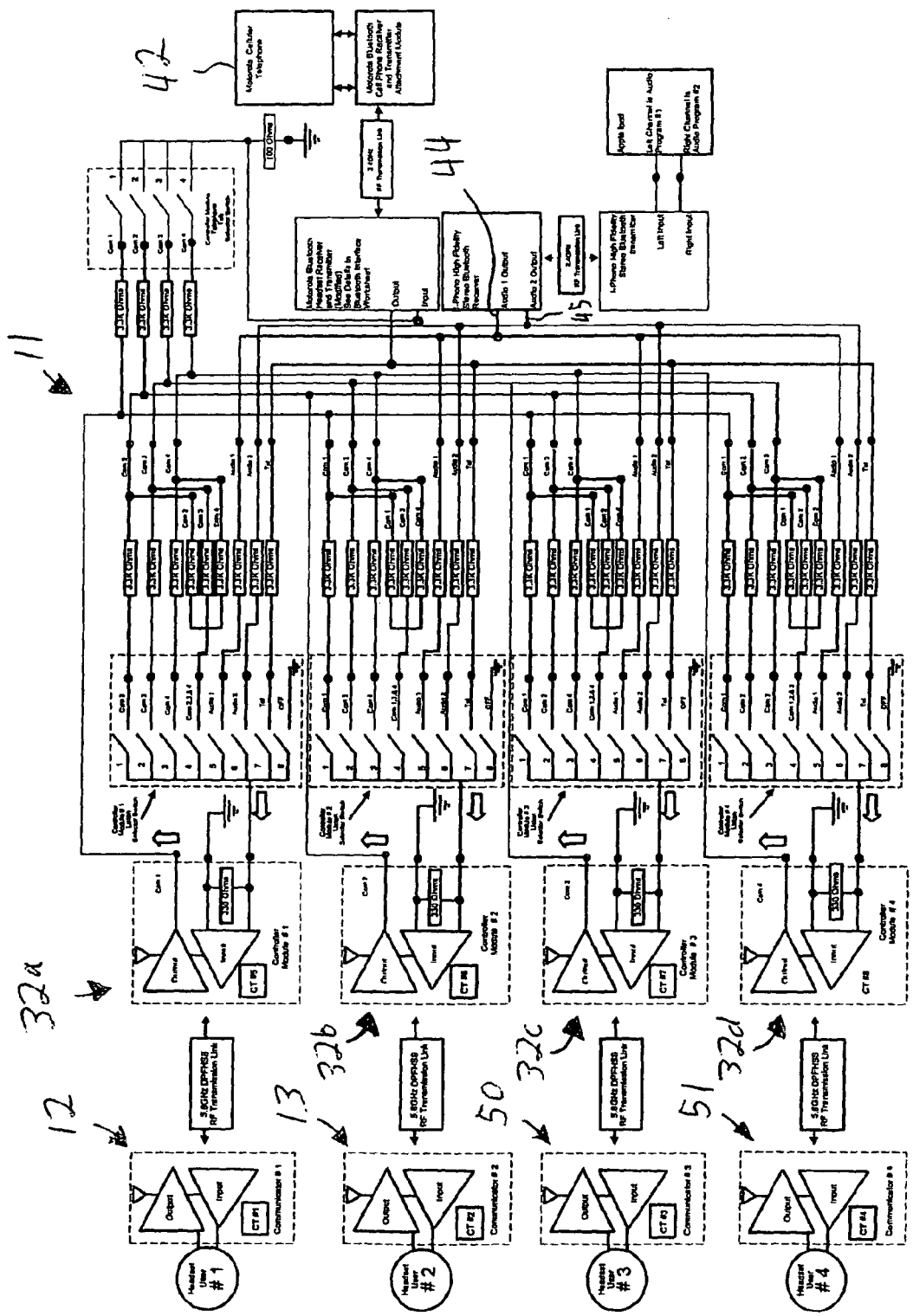
FIG. 2 is a simplified circuit diagram of the communications system of FIG. 1 wherein manual mode switching is utilized.

FIG. 2 shows a circuit diagram for the system shown in FIG. 1, in which network control is accomplished by means of manual switching. In this embodiment, each communicator consists of a headset such as an Ety-Com Mobile Headset manufactured by Etymotic Research Incorporated, and a 5.8 Ghz transmission and reception module, paired to a companion module in the network controller. However, as will be appreciated by those having ordinary skill in the art and indicated previously, other types of transmission are reception means and modes can be used without departing from the sprit of the invention.

As also shown in FIG. 2, additional audio devices including a cellular telephone 42 and two audio program channels 44,45, are connected to the network controller by means of separate wireless transmission links. In this example these connections are accomplished by Bluetooth transmission at 2.4 Ghz, following the Bluetooth protocols for cellular telephone communication and high fidelity audio transmission. The cellular telephone transmission link was established by modifying a Motorola Model HS 820 Bluetooth Receiver and Ear Piece, available from Radio Shack, and shown in detail in FIG. 4, in conjunction with a Motorola Bluetooth Adapter Model SYN089B, also available from Radio Shack. Wireless connection to Audio Programs #1 and #2 were established by the use of a Blue Take Technology Model BT430 Transmitter and modified BT 420 Headphone. The headphone modification involved removing the headphone loudspeakers and making a direct connection to the outputs of the headphone amplifier.

Desired communications connections are implemented by an appropriate switching of four controller module selector switches involving eight individual switches each, and a four switch telephone talk selector. This combination of switches allows for the communicator users to select who of the additional users they wish to communicate with, what audio program sources they wish to hear and if the wish to receive or make a telephone call. Since each transmission and receiver module in the system desires a microphone level input and provides a line level output, a number of attenuating voltage dividers are used in this implementation consisting of a series resistor value of 3.3 k Ohms and a shunt value of 330 Ohms. As an example, the line level output of Controller Module 1 is attenuated by the combination of 3.3 k ohms and 330 ohms when its output is selected as an input to Controller Module 2 by closing Switch number 1 of the Listen Selector switch for Controller Module 2. So as to avoid undesirable system echo when the system is used for connecting to a telephone system, it is desired that the side tone typically associated with normal telephone techniques, be turned off. This is not normally the situation, with cordless telephones, however when used as described in FIG. 2, a portion of any signal driving the input of one of the Controller Modules will appear as an attenuated but audible signal at the output of that module, and consequently returned to the caller as an undesired echo.

Figure 3:
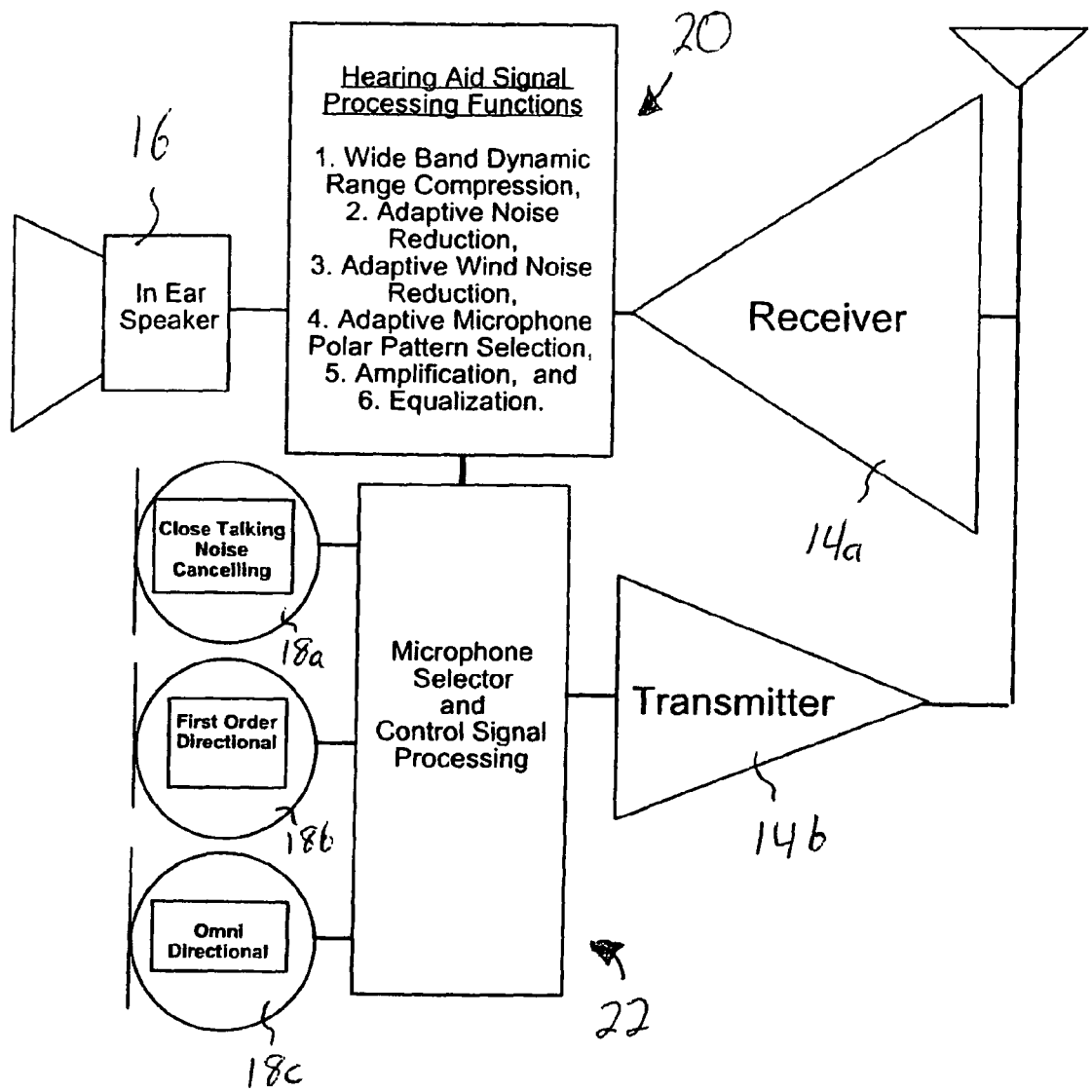
FIG. 3 is a block diagram of a personal communicator used as a part of the communications system of FIG. 1.

FIG. 3 presents a more detailed description of a communicator 12, 13, 50 and 51 shown in FIGS. 1 and 2, as well as showing other desirable features incorporated therein to allow improved communication for individuals with varying degrees of hearing loss. The functions described in the two system blocks (i.e., 20 and 22) between the transmitter 14*b*, receiver 14*a*, microphones 18*a-c* and in ear speaker 16, allow for both traditional hearing aid functions independent of wireless communications, as well as improved audibility for wireless communicator communications. By providing functions such as wide band compression, equalization, adaptive noise reduction, adaptive wind noise reduction, and adaptive microphone polar pattern selection, which are well understood by those skilled in the art of hearing aid technology, a communicator user will be capable of better communications intelligibility, as compared to conventional in ear speaker linear amplification. By integrating multiple microphones into the communicator, a user will obtain further benefit from head worn directional microphones, also well understood to those having ordinary skill in the art of hearing aid technology, when using the communicator in a hearing aid only mode. By using the Close Talking Noise Canceling Microphone, shown connected to the Microphone Selector and Control Signal Processing block, for communicator functions, other individuals in communications with the user will benefit from reduced background noise masking the voice signals from the communicator user.

Figure 4:
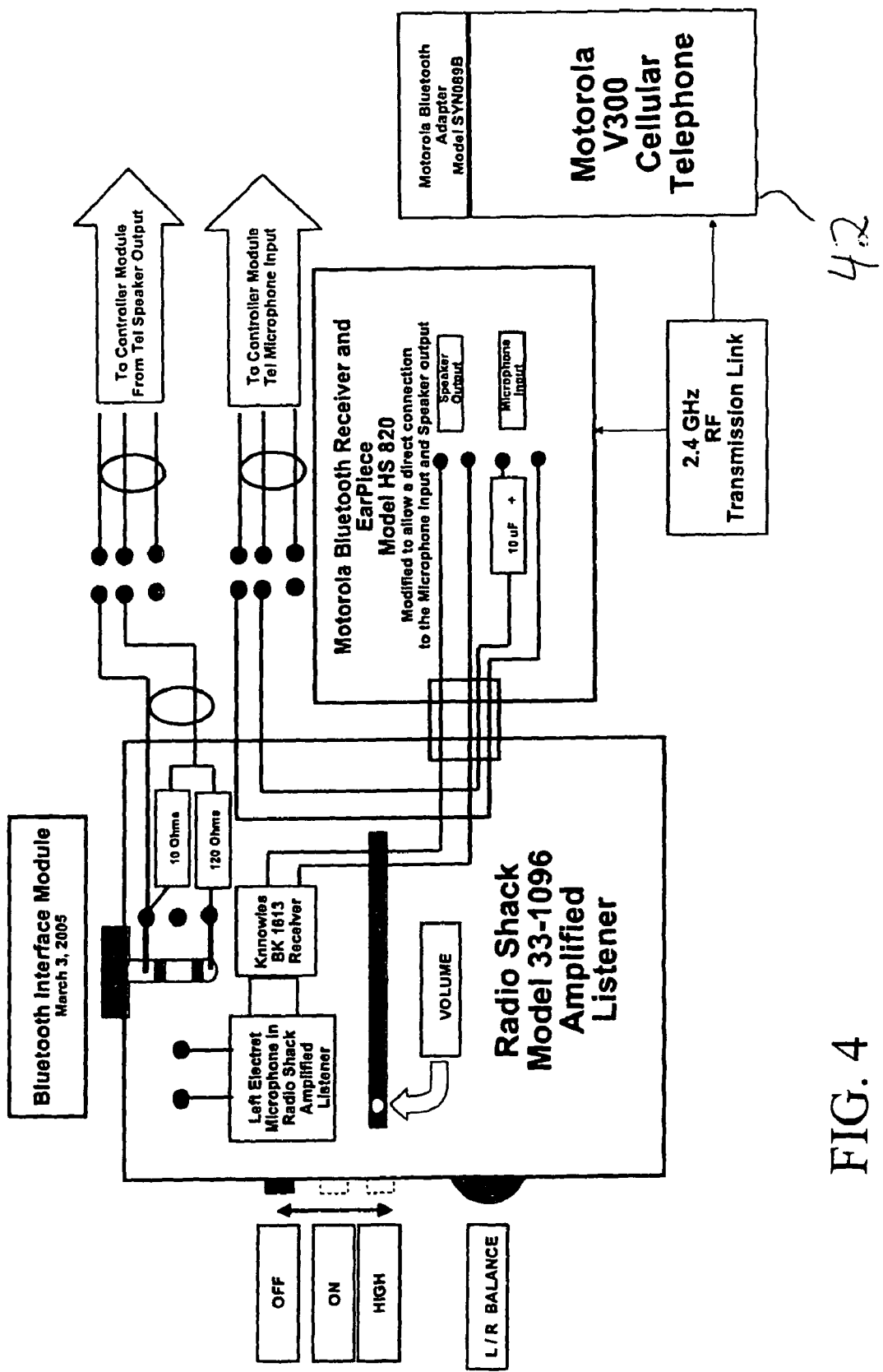
FIG. 4 is a simplified circuit diagram of a Bluetooth Cellular telephone interface for use with the communications system of FIG. 1.

FIG. 4 presents details of one method by which an external source, for example a cellular telephone such as a Motorola Model V300 Cellular telephone, can be wirelessly coupled to the network controller or base unit 11 shown in FIGS. 1 and 2. Transmissions from the telephone 42 are established by means of a Motorola Bluetooth adapter previously described. Transmissions from the Network Controller are established by means of a modified Motorola Bluetooth receiver and Ear Piece also previously described. The need for modification resulted from the fact that there was no common ground between the Ear Piece microphone input and loudspeaker output. If an attempt was made to establish a common ground so as to be compatible with the Network Controller, the Ear piece device would become unstable. To circumvent this problem, a Knowles Electronics Model BK 1613 receiver was connected to the loudspeaker terminals of the Ear Piece and acoustically coupled to one of two integral electret condenser microphones in a Radio Shack Model 33-1096 Amplified Listener. The output of the Amplified Listener was subsequently adjusted so as to be voltage level compatible with inputs to the Network Controller. The net result of this modification allowed a stable common ground to be established with the microphone input and loudspeaker output of a Bluetooth Link interface with the Motorola V300 Cellular telephone.

Figure 5:
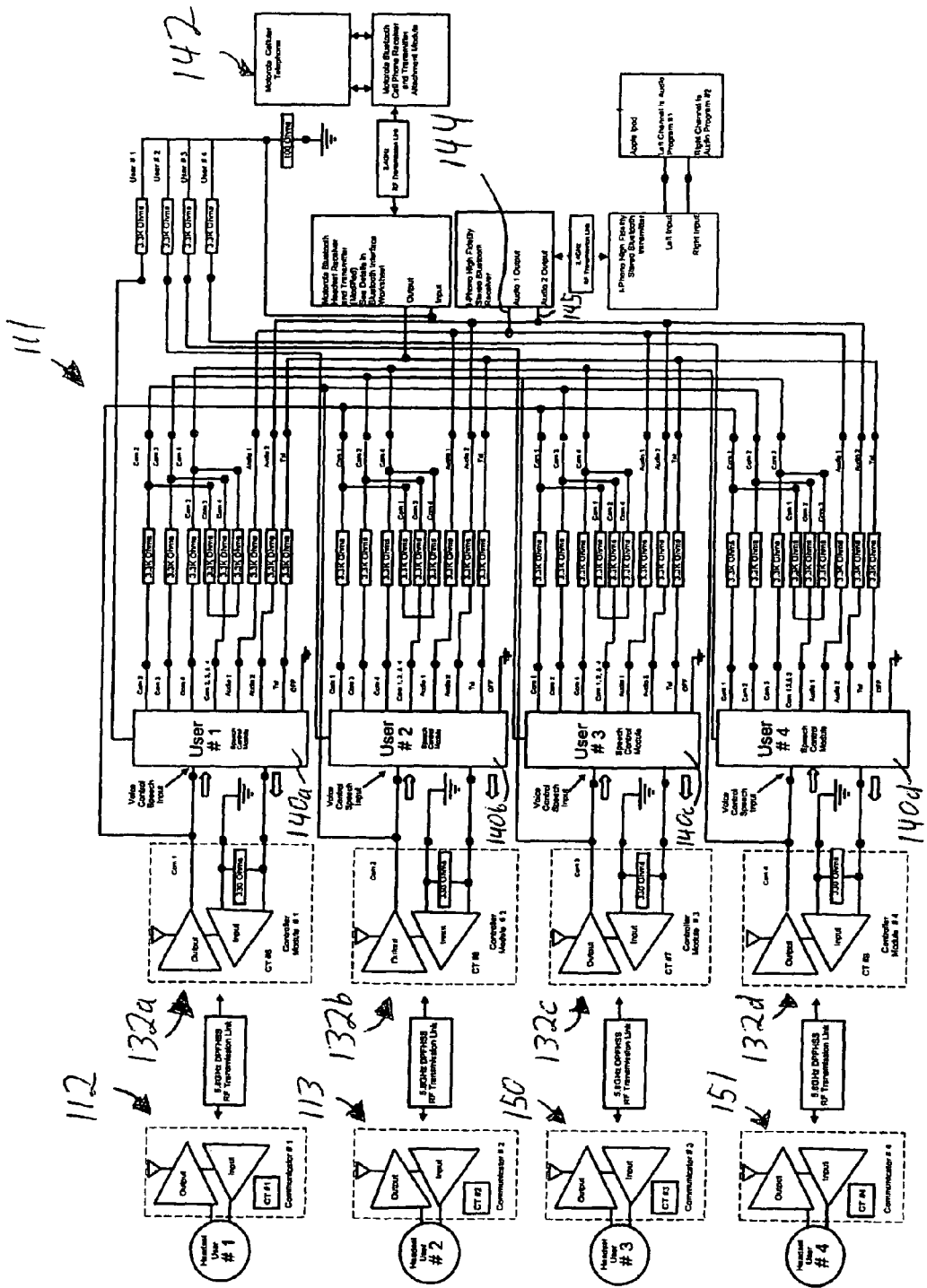
FIG. 5 is a simplified circuit diagram of another embodiment of a communications system in accordance with the present invention that uses speech recognition for system control.

FIG. 5 is similar to FIG. 2, except for the fact that the various connections and adjustments within the Network Controller or base unit 11 are established by means of the speech recognition, word spotting and simulated voice prompting methods. In contrast to the manual switches shown in FIG. 2, these switches are replaced by four User Speech Control Modules 140*a-d*. With this method of control, individual communication network users each contribute to control the status of the system, with out need to make physical contact with the Network Controller. This capability allows the users to operate the system successfully as long as each user is within the coverage range of the individual, for example, 5.8 GHz transmission links. By so doing, a location for the Network Controller can be selected for optimum convenience by the users. As examples, Network Controllers could be centrally located in living quarters, carried on persons, placed in cars or other modes of transportation, located in restaurants, offices spaces, retail establishments, and in public areas.

Figure 6:
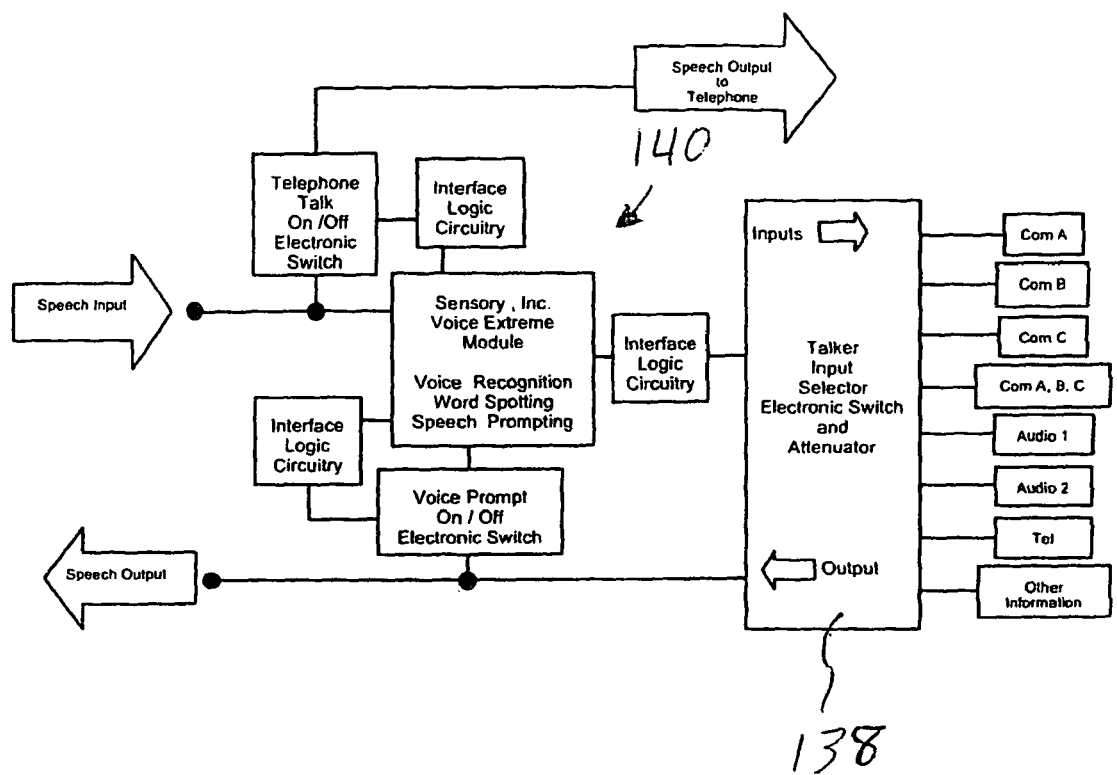
FIG. 6 is a simplified functional block diagram of an individual speech control and speech prompting portion of the communications system shown in FIG. 5.

FIG. 6 presents details of one of the four Speech Control Modules 140*a-d* of FIG. 5, in which the module inputs and outputs correspond to the equivalent inputs and outputs shown in FIG. 5. The Voice Extreme Module manufactured by Sensory, Inc. has the capability of recognizing a small vocabulary of spoken commands on a speaker independent or dependant basis, recognizing key words in continuous speech, and generating simulated speech as a means of providing feedback to a talker. Once the module has determined an action based on a speech input, it can react with the system users in many ways. If for example a user wants help using the system, a spoken command such as "I need System Help" would prompt a menu driven dialog with the module. Functions involving interconnections with the various communicator users, input source selection, telephone interactions functions, and level adjustments are a few examples.

These functions are executed by the Voice Extreme Module by means of logic signals and simulated speech output. These logic signals in turn activate logic controlled switches and volume controls, which are shown as system blocks (e.g., block 138) connected to the speech module and the inputs and outputs of the complete Speech Control Module. Once such a command and control capability has been established, it is possible to extend the system functionality to interact with any function that can respond to a user by means of sound.

Examples of such functionality include: 1) Providing date, time, and calendar information; 2) Providing schedule prompts and event details; 3) Provide GPS based location and navigation functions; 4) Managing task lists; 5) Providing operating instructions for difficult to use equipment; 6) Interacting with guest Communicator users; 7) Interacting with location based information and assistance services; 8) Providing command functions for appliances and environmental control devices; and, 9) Providing command functions for personal computer.

Figure 7:
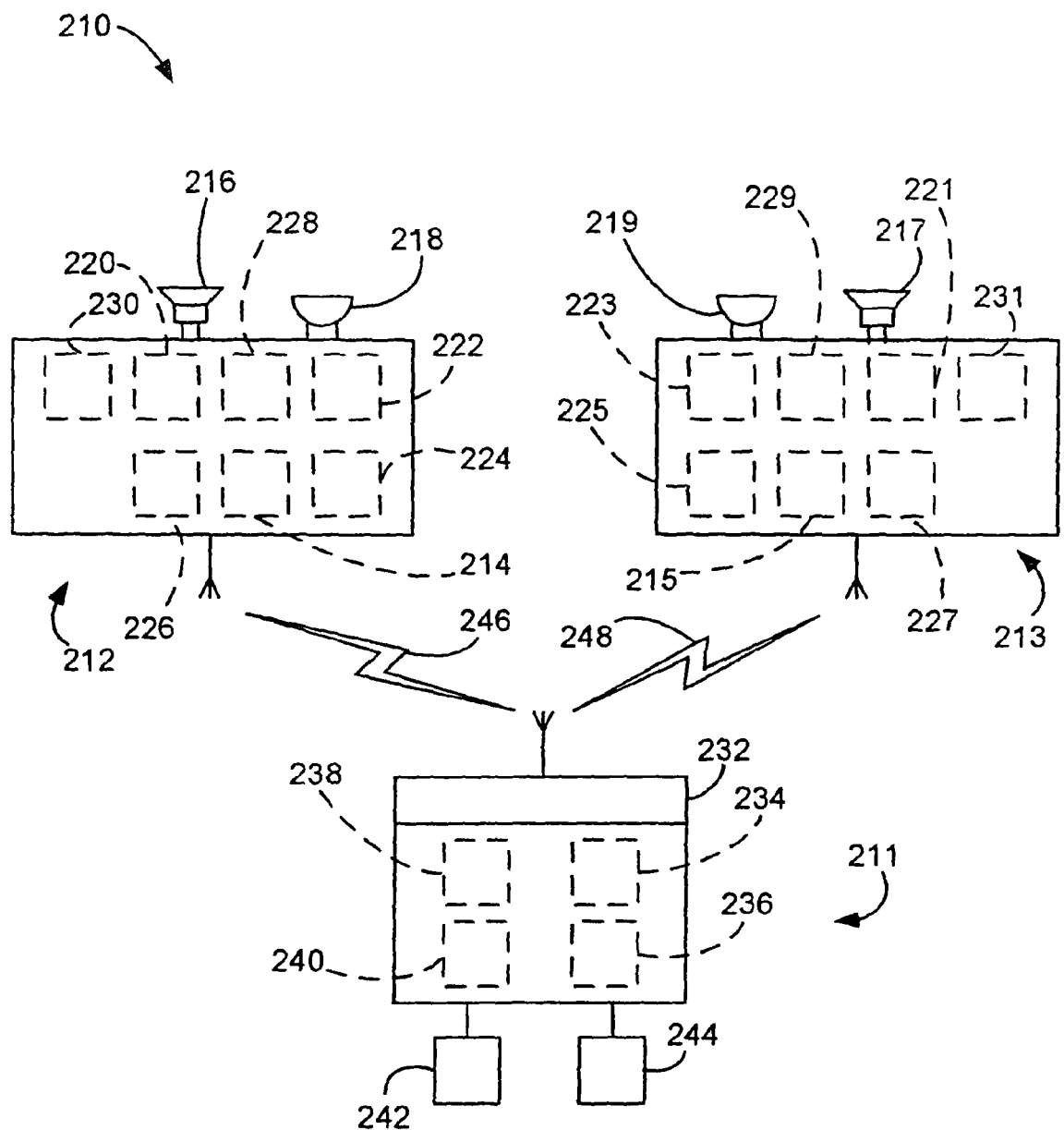
FIG. 7 is a simplified block diagram of another embodiment of a communications system in accordance with the present invention.
Figure 8:
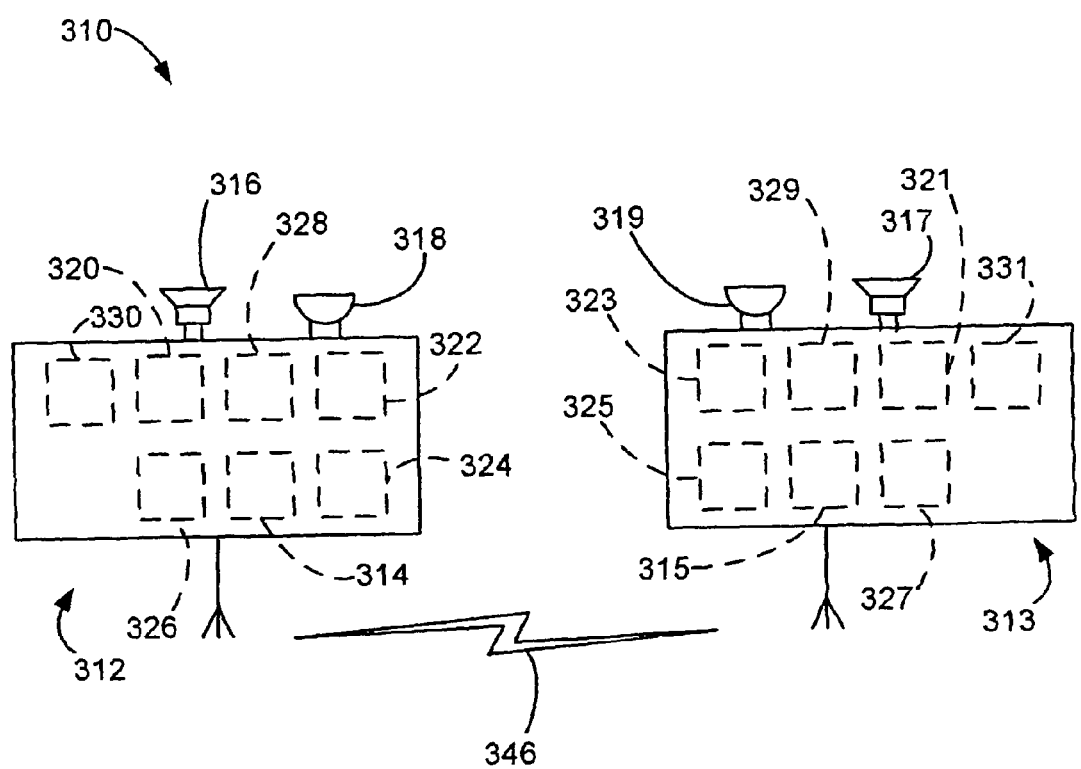
FIG. 8 is a simplified block diagram of yet another embodiment of a communications system in accordance with the present invention.

FIGS. 7 and 8 are simplified block diagrams of other embodiments of communications system in accordance with the present invention. In FIG. 7, the system 210 includes, but is not limited to, a first remote unit 212 comprising a receiver 214 and a hearing aid circuit 220 operatively coupled to a speaker 216. Also, a second remote unit 213 is provided comprising a transmitter 215 operatively coupled to a microphone 219. Further, a base unit 211 is provided comprising a transceiver unit 232 and relaying wireless transmissions 246, 248 from the second remote unit 213 to the first remote unit 212.

In FIG. 8, direct communication is provided between the first remote unit 312 and the second remote unit 313. Accordingly, a base unit can be omitted, if desired.

Figure 9:
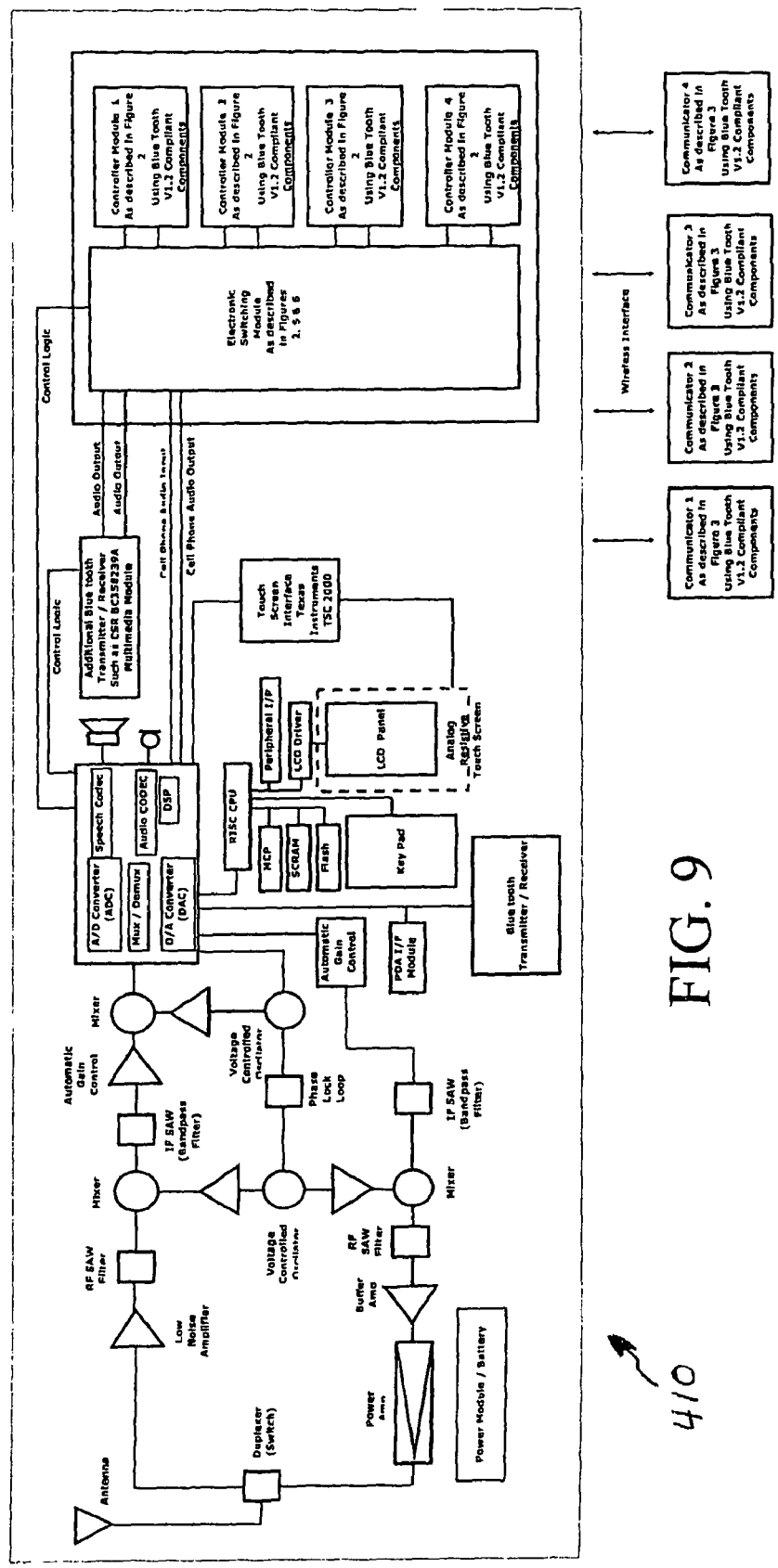
FIG. 9 is a simplified block diagram of a cellular telephone in which the embodiment of FIG. 7 is integrated into a cellular telephone.

In FIG. 9, a system block diagram is shown in which the embodiment of FIG. 7 is implemented within a cellular telephone. In addition to the typical components of a cellular telephone, this phone has been configured with the following addition: 1) a Bluetooth type transceiver configured for headset communications, such as a CSR BLUECORE 3—Audio Flash Model Bc31A223A; 2) a Bluetooth type transceiver configured for multimedia communications, such as a CSR BLUECORE 3—Audio Flash Model BC358239A; 3) Four controller modules and associated electronic switching components as previously described in FIGS. 2, 5 and 6; 4) An analog touch screen such as an Apex Analog Resistive Touch Screen Model 9510, and touch screen interface such as a Texas Instruments Model TSC2000; and, 5) Control logic and signal connections between the added components and the cellular telephone main signal processor.

Figure 10C:
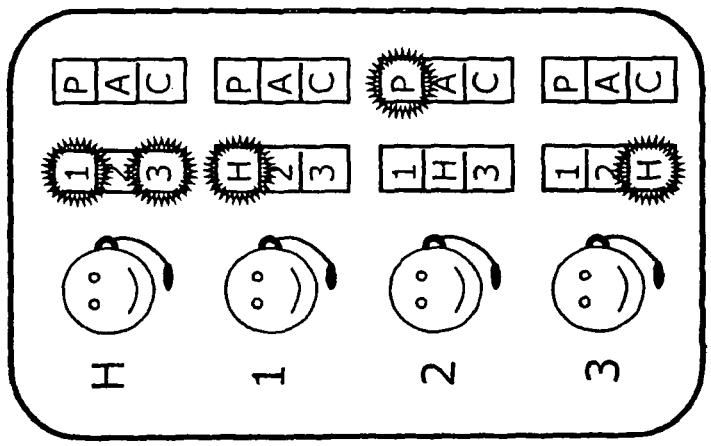
FIGS. 10A, 10B and 10C are embodiments of graphics for the user interface touch screen display shown in FIG. 9.
Figure 10B:
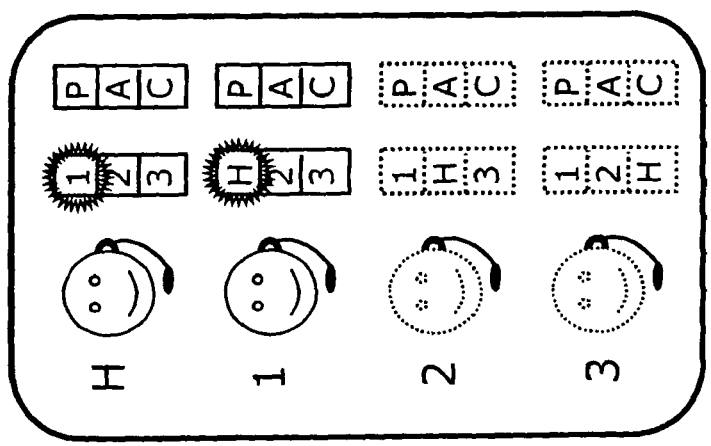
Figure 10A:
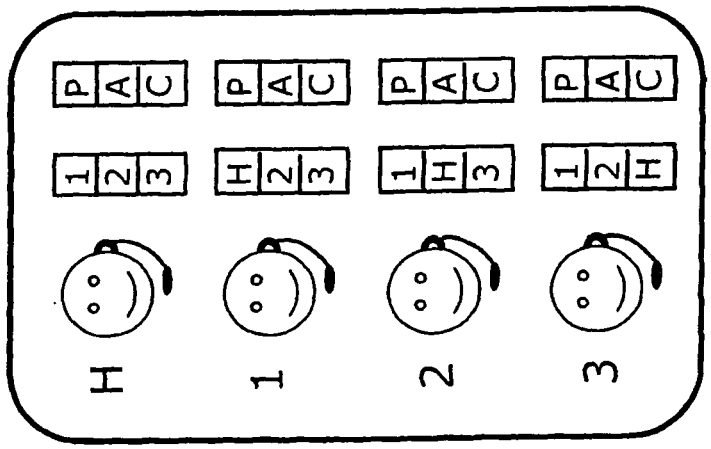

With these additions, the cellular telephone is able to take on the function of a system controller, and manage the interconnections between up to four communicators, a cellular telephone and two channels of multimedia audio information. Through the use of the touch screen interface, as shown in FIGS. 10A-C, the system host (H) is able to configure and view the audio connection status between up to three additional users. FIG. 10A indicates that four users (H, 1, 2 and 3) have established contact with the controller, but that they are not as yet connected with each other. FIG. 10B indicates that users 2 and 3 are no longer connected to the controller and that the host (H) and user 1 have an established a two-way connection. Further, FIG. 10C indicates that four users are now connected and that users H, 1 and 3 configured for a three-way conversation, whereas user 2 is configured to speak over the cellular telephone.

It should be emphasized that the above-described embodiments of the present invention, particularly, any "preferred" embodiments, are possible examples of implementations merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention, and protected by the following claims.

What is claimed is:

1. A system comprising:
multiple communicators coupled to each other over a local area wireless network, each of the multiple communicators comprising a microphone and a speaker operatively coupled to a signal processor, circuitry for assisting a hearing impaired person, and a graphical user interface depicting one or more available communication links associated with other communicators or an external source and wherein the available communication links can be selectively enabled by a user;
a controller operatively coupled to each of the communicators to provide a selected communication link between the communicators; and,
wherein the circuitry for assisting a hearing impaired person performs at least two functions from the group comprising: wide band compression; equalization, adaptive noise reduction, adaptive wind noise reduction, adaptive microphone polar pattern selection; speech recognition; and selection of said external source.

2. The system of claim 1 the communicators comprising an earphone and the microphone connected to a transceiver.

3. The system of claim 1 wherein the selected communication link is unidirectional.

4. The system of claim 1 wherein the selected communication link is bidirectional.

5. The system of claim 1 wherein the external source is operatively coupled to the controller to provide audio signals to a user, the external source comprising at least one of a telephone, a radio, a television, and a media player.

6. The system of claim 1, each communicator comprising a signal processor.

7. The system of claim 6, the signal processor comprising a wide band dynamic range compression circuitry.

8. The system of claim 6, the signal processor comprising adaptive noise reduction circuitry.

9. The system of claim 6, the signal processor comprising adaptive microphone polar pattern selection and equalization circuitry.

10. The system of claim 1, wherein the controller is installed in a public structure, an office, a house, a casino, a retail environment, a restaurant, a vehicle, a theater, or a conference room.

11. The system of claim 1, wherein the controller is contained in a housing suitable for transport within a pocket in an article of clothing.

12. The system of claim 1 wherein at least one of the communicators comprising a hearing aid circuit operatively coupled to the speaker.

13. The system of claim 1 wherein the communication link is encrypted.

14. A system comprising:
a first remote unit comprising a receiver and a hearing aid circuit operatively coupled to a speaker wherein said circuitry is for assisting a hearing impaired person;
a second remote unit comprising a transmitter operatively coupled to a microphone;
a base unit comprising a transceiver unit and relaying wireless transmissions from the second remote unit to the first remote unit over a local area wireless network; and,
a graphical user interface depicting one or more available communication links associated with other devices and wherein the available communication links can be selectively enabled by a user; and, wherein the hearing aid circuit performs at least two functions from the group comprising: wide band compression; equalization, adaptive noise reduction, adaptive wind noise reduction, adaptive microphone polar pattern selection; speech recognition; and selection of an external source.

15. The system of claim 14, the hearing aid circuit operatively coupled to a microphone.

16. The system of claim 14, the transceiver unit comprising a plurality of transceiver modules.

17. The system of claim 14, the base unit comprising an accessibility control function that allows another wireless remote unit to discover the base unit.

18. The system of claim 14, the base unit further comprising a controller that switches communications between the first remote device and said external source.

19. The system of claim 14 wherein the wireless transmission are encrypted.

* * * * *